United States Patent [19]

Marquis

[11] Patent Number: 5,298,081
[45] Date of Patent: Mar. 29, 1994

[54] PROCESS FOR REMOVING CURED FIBERGLASS RESIN FROM SUBSTRATES

[75] Inventor: Edward T. Marquis, Austin, Tex.

[73] Assignee: Texaco Chemical Company, White Plains, N.Y.

[21] Appl. No.: 615,188

[22] Filed: Nov. 19, 1990

[51] Int. Cl.$^5$ .................. B08B 3/08; C09D 9/00; C11D 7/50
[52] U.S. Cl. .................. 134/38; 134/40; 134/42; 252/153; 252/170; 252/174.14
[58] Field of Search .................. 134/38, 40, 42; 252/170, 153, 174.14

[56] References Cited

U.S. PATENT DOCUMENTS

| | | | |
|---|---|---|---|
| Re. 27,432 | 7/1972 | Torrezano et al. | 8/621 |
| 4,009,048 | 2/1977 | Jensen et al. | 134/12 |
| 4,120,810 | 10/1978 | Palmer | 252/164 |
| 4,309,300 | 6/1982 | Danforth et al. | 252/170 |
| 4,336,072 | 6/1982 | Moore et al. | 134/42 |
| 4,514,530 | 4/1985 | Sellstrom et al. | 523/456 |
| 4,594,111 | 6/1986 | Coonan | 134/3 |
| 4,645,617 | 2/1987 | Vivian | 252/165 |
| 4,680,133 | 7/1987 | Ward | 252/153 |
| 4,704,234 | 11/1987 | Petersen et al. | 134/40 |
| 4,780,235 | 10/1988 | Jackson | 252/170 |
| 4,812,255 | 3/1989 | Suwala | 252/170 |
| 4,965,010 | 10/1990 | Swett | 252/170 |
| 5,024,780 | 6/1991 | Leys | 134/38 |
| 5,064,557 | 11/1991 | Fusiak | 134/38 |

FOREIGN PATENT DOCUMENTS 60-121273 6/1985 Japan .
670832A5 7/1989 Switzerland .
1201523 8/1970 United Kingdom .

OTHER PUBLICATIONS

Luttringhaus et al. (Angew. Chem. Internat. Edit., vol. 3 (1964) No. 4, pp. 260-269.
Letter from Texas Chemical Co. to Whitaker Solvents & Chemicals, dated Feb. 1, 1989.
H. L. Jackson & R. J. Gallagher Jr., "DBE Purges Polyurethane Equipment Without Methylene Chloride Risks," Elastomerics, Oct. 1990, pp. 56-60.
A. Luttringhaus & H. W. Dirksen, "Tetramethylurea as a Solvent and Reagent," Angew. Chem. Chem. Internat. Edit., vol. 3 (1964) No. 4, pp. 260-269.

Primary Examiner—R. Bruce Breneman
Assistant Examiner—Saeed Chaudhry
Attorney, Agent, or Firm—James L. Bailey; Kenneth R. Priem; Russell R. Stolle

[57] ABSTRACT

A process for the dissolution of cured polyester resins is disclosed. A cured polyester resin may be dissolved, or removed from a substrate, by contacting the polyester resin with an alkylene carbonate, alone or as a co-solvent with one or more other solvents in which the cured polyester resin is at least partially soluble.

20 Claims, No Drawings

PROCESS FOR REMOVING CURED FIBERGLASS RESIN FROM SUBSTRATES

BACKGROUND OF THE INVENTION

1. Field of the Invention

The invention relates to solvents for loosening or removing cured fiberglass resin from tools, processing equipment and other substrates.

2. Description of Related Methods

A variety of solvents have been used to clean processing equipment, metal parts and tools after a polyester resin (fiberglass) has cured on them. Acetone, methyl ethyl ketone, and diacetone alcohol are the solvents most commonly used to remove cured polyester resin from the substrates to which it is attached. However, acetone and methyl ethyl ketone are not favored because of safety hazards resulting from their high volatilities and low flash points. Additionally, acetone and methyl ethyl ketone currently are suspected neurotoxins. Diacetone alcohol is very polar, and therefore presents processing problems when used alone. Thus, it would be a substantial improvement in the art if a relatively inexpensive yet effective solvent formulation were available to remove cured polyester resins from substrates, and that reduced or avoided the environmental, health and safety problems of the prior art solvent formulations.

Applicant has discovered, surprisingly, that a cured polyester resin may be removed from a substrate by contacting the polyester resin with an alkylene carbonate, alone or as a co-solvent in a mixture containing one or more other solvents. The present inventive process, by substituting, in whole or in part, alkylene carbonate for the more hazardous prior art solvents, reduces or avoids many of the health, safety and environmental hazards associated with the prior art solvents, and is economically attractive as well.

SUMMARY OF THE INVENTION

The invention concerns, in a process for removing a cured polyester resin from a substrate by contacting said polyester resin with a solvent in which said cured polyester resin is at least partially soluble, the improvement comprising diluting said solvent with a co-solvent comprising alkylene carbonate. In another of its aspects, the invention concerns a process for removing cured polyester resin from a substrate, comprising contacting a cured polyester resin with a co-solvent system comprising a mixture of alkylene carbonate and at least one non-alkylene carbonate solvent selected from the group consisting of aromatic hydrocarbons, ketones, esters, ethers, glycol ethers, imidazoles, tetramethyl urea, N,N'-dimethyl ethylene urea, and N-methyl pyrrolidone. The invention also concerns a process for dissolving cured polyester resin, comprising contacting a cured polyester resin with an alkylene carbonate.

DESCRIPTION OF THE PREFERRED EMBODIMENTS

Alkylene carbonates useful in the present invention may be represented by the following formula:

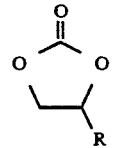

where R is H or an alkyl group containing from 1 to about 20 carbon atoms. It is preferred that R be H or a methyl group, i.e. that the alkylene carbonate be ethylene carbonate or propylene carbonate. Ethylene carbonate and propylene carbonate are commercially available from Texaco Chemical Co. as Texacar ® EC Ethylene Carbonate and Texacar ® PC Propylene Carbonate, respectively. Alternatively, a mixture of alkylene carbonates may be used, preferably a mixture of ethylene carbonate and propylene carbonate, such as, for example, Texacar ® EC-50.

Solvents that may be diluted or replaced by alkylene carbonates in the present invention include aromatic hydrocarbons, ketones, esters, ethers, glycol ethers, imidazoles, tetramethyl urea, N,N'-dimethyl ethylene urea, and N-methyl pyrrolidone. For example, Applicant has obtained good results using formulations containing an alkylene carbonate and one or more of the following solvents: tetramethyl urea, toluene, methyl isobutyl ketone, 1,2-dimethylimidazole, N,N'-dimethyl ethylene urea, propylene glycol methyl ether, cyclohexanone, acetophenone, and isobutyl isobutyrate. Optionally, other solvents may be added to the formulations of the present invention as well.

Preferably, the proportion of conventional solvent replaced with alkylene carbonate in a formulation containing one or more conventional (non-alkylene carbonate) solvents will be such that the alkylene carbonate and the conventional solvents in the formulation are present in a weight ratio of alkylene carbonate to total conventional solvent of about 2:1. Surprisingly, Applicant found no improvement in dissolution power where the weight ratio of alkylene carbonate to conventional solvent was decreased from about 2:1 to about 1:1 However, the greatest percentage of cured polyester resin removed was observed where the weight ratio of alkylene carbonate to conventional solvents was about 1:3. Those skilled in the art will appreciate that the proportion of conventional solvents in a formulation which should be replaced with alkylene carbonate for a given polyester resin involves a balance of possible reduction in dissolution power versus the reduction or avoidance of additional expense and/or environmental, health and safety risks associated with the conventional solvents. Applicant has demonstrated the use of several different formulations in the examples that follow. Alkylene carbonate also may be used alone to dissolve cured polyester resins.

Optionally, other additives may be employed in the formulations of the present invention. For example, suitable thickeners may be included, such as ethylcellulose, hydroxypropyl cellulose, organic modified clay, hydrogenated castor oil, and the like. Surfactants, to enhance the water washability of the substrate, may be included as well. Suitable surfactants include potassium oleate, the dioctyl ester of sodium sulfosuccinic acid, sodium alkylnaphthalene sulfonate, sodium alkylbenzene sulfonate, and the like.

Applicant's inventive process is effective at temperatures of from about room temperature to about 100° C.

and at pressures of from about atmospheric to several hundred psi. Optionally, the process of the present invention may be performed at an elevated temperature. While Applicant's invention works well at room temperature, more effective dissolution may be obtained by heating the alkylene carbonate-containing solvent to a temperature of about 50° to about 100° C. The alkylene carbonate-containing solvent may be applied to the polyester resin in any conventional manner. Typically, the polyester resin-coated substrate will be placed in a vat or sonic bath containing the alkylene carbonate (and, optionally, conventional co-solvent.) The period of time for which the alkylene carbonate-containing solvent should be permitted to work undisturbed on the polyester resin to be removed will vary. After said period of time, agitation of the surfaces to be cleaned of the resin via wiping, brushing or scraping is preferred.

The invention will be further illustrated by the following examples, which are given by way of illustration and not as limitations on the scope of this invention.

EXAMPLES

In the examples recorded in the table below, the following procedure was used. Previously coated stainless steel ⅜" screw stock rods were wire brushed and cleaned with a solvent. Rods that had been coated with cured fiberglass were treated with acetone to remove any fiberglass residue; those that had been coated with cured flexible or rigid polyurethane foam were treated with methylene chloride. The rods were then sand blasted with micro beads. The rods were then coated with a glycol maleate polyester in styrene (Bradcoat ® by Bradson Supply Inc.) that was cured with methyl ethyl ketone peroxide. The coatings were then allowed to cure for two days or more before dissolution studies were begun. Each coated stock rod was then suspended in a beaker from a ring stand. Each beaker contained one of the alkylene carbonate-containing formulations to be tested. At the bottom of each beaker was a stirring bar. After from about 16 to about 22 hours at room temperature the rods were observed and the approximate percentage of polyester resin removed by each formulation was estimated and recorded.

| Ex. No. | Co-Solvent System Components | Wt. Ratio of Components | Approximate % Polyester Resin Removed |
|---|---|---|---|
| 1 | PC/1,2-DMI/Acetone | 80/80/20 | 30% |
| 2 | EC/TMU/IBIB | 73/65.1/64 | 25% |
| 3 | EC/TMU/MIBK | 67.8/69/59.8 | 25% |
| 4 | PC/Acetophenone/Cyclohexanone | 45/45/90 | 25% |
| 5 | PC/Acetophenone/Cyclohexanone | 45/90/45 | 20% |
| 6 | PC/Acetophenone/Cyclohexanone | 60/60/60 | 5% |
| 7 | PC/Acetophenone/Cyclohexanone | 90/45/45 | 2% |
| 8 | Acetophenone/Cyclohexanone | 90/90 | 2% |
| 9 | Acetophenone/Cyclohexanone | 120/60 | 1% |
| 10 | Acetophenone/Cyclohexanone | 60/120 | 1% |
| 11 | PC/1,2-DMI | 60/120 | 25% |
| 12 | PC/1,2-DMI | 90/90 | 20% |
| 13 | PC/1,2-DMI | 120/60 | 20% |
| 14 | PC/1,2-DMI/MIBK | 80/80/20 | 20% |
| 15 | PC/1,2-DMI/IBIB | 60/60/60 | 5% |
| 16 | PC/TMU | 110/110 | 10-25% |
| 17 | PC/NNDMEU/Acetone | 60/60/60 | 15% |
| 18 | PC/NNDMEU/1,2-DMI | 60/60/60 | 10% |
| 19 | PC/NNDMEU/MIBK | 60/60/60 | 10% |
| 20 | PC/Cyclohexanone | 60/120 | 15% |
| 21 | PC/Cyclohexanone | 100/100 | 5% |
| 22 | PC/Cyclohexanone | 120/60 | 5% |
| 23 | PC/Cyclohexanone/PM | 60/60/60 | 10% |
| 24 | PC/Acetophenone | 100/100 | 5% |
| 25 | PC/Acetophenone | 60/120 | 2% |
| 26 | PC/Acetophenone | 120/60 | 2% |
| 27 | PC/Acetone | 100/100 | 5% |
| 28 | PC/N-methyl pyrrolidone | 100/100 | 5% |

EC = Ethylene carbonate; PC = Propylene carbonate; TMU = Tetramethyl urea; MIBK = Methyl isobutyl ketone; IBIB = Isobutyl isobutyrate; 1,2-DMI = 1,2-dimethylimidazole; NNDMEU = N,N'-dimethyl ethylene urea; PM = Propylene glycol methyl ether.

I claim:

1. A process for removing cured polyester resin from a substrate, consisting essentially of contacting a cured polyester resin with a co-solvent system comprising a mixture of alkylene carbonate and at least one non-alkylene carbonate solvent selected from the group consisting of aromatic hydrocarbons, ketones, imidazoles, tetramethyl urea, N,N'-dimethyl ethylene urea, and N-methyl pyrrolidone.

2. The process of claim 1, in which the non-alkylene carbonate solvent is selected from the group consisting of tetramethyl urea, toluene, methyl isobutyl ketone, 1,2-dimethylimidazole, N,N'- dimethyl ethylene urea, cyclohexanone, acetophenone, and N-methyl pyrrolidone.

3. The process of claim 1, in which the co-solvent system contains a second non-alkylene carbonate solvent.

4. The process of claim 3, in which the second non-alkylene carbonate solvent is selected from the group consisting of aromatic hydrocarbons, ketones, imidazoles, tetramethyl urea, N,N'-dimethyl ethylene urea, and N-methyl pyrrolidone.

5. The process of claim 3, in which the second non-alkylene carbonate solvent is selected from the group consisting of tetramethyl urea, toluene, methyl isobutyl ketone, 1,2-dimethylimidazole, N,N'-dimethyl ethylene urea, cyclohexanone, acetophenone, and N-methyl pyrrolidone.

6. The process of claim 1, in which the non-alkylene carbonate solvent is 1,2-dimethylimidazole.

7. The process of claim 1, in which the non-alkylene carbonate solvent is tetramethyl urea.

8. The process of claim 1, in which the mixture contains alkylene carbonate and non-alkylene carbonate solvent in a weight ratio of alkylene carbonate to total non-alkylene carbonate solvent of about 2:1.

9. The process of claim 1, in which the mixture contains alkylene carbonate and non-alkylene carbonate solvent in a weight ratio of alkylene carbonate to total non-alkylene carbonate solvent of about 1:3.

10. A process for removing cured polyester resin from a substrate, consisting essentially contacting a cured polyester resin with a co-solvent system comprising a mixture of alkylene carbonate and at least two non-alkylene carbonate solvents selected from the group consisting of aromatic hydrocarbons, ketones, imidazoles, tetramethyl urea, N,N'-dimethyl ethylene urea, acetone, and N-methyl pyrrolidone.

11. The process of claim 10, in which at least one of the non-alkylene carbonate solvents is selected from the group consisting of tetramethyl urea, toluene, methyl isobutyl ketone, 1,2-dimethylimidazole, N,N'-dimethyl ethylene urea, cyclohexanone, acetophenone, and N-methyl pyrrolidone.

12. The process of claim 10, in which at least two non-alkylene carbonate solvents are selected from the group consisting of tetramethyl urea, toluene, methyl isobutyl ketone, 1,2-dimethylimidazole, N,N'-dimethyl ethylene urea, cyclohexanone, acetophenone, and N-methyl pyrrolidone.

13. The process of claim 10, in which at least one of the non-alkylene carbonate solvents is 1,2-dimethylimidazole.

14. The process of claim 10, in which at least one of the non-alkylene carbonate solvents is tetramethyl urea.

15. The process of claim 10, in which the co-solvent system comprises a mixture of an alkylene carbonate, 1,2-dimethylimidazole, and acetone.

16. The process of claim 10, in which the mixture contains alkylene carbonate and non-alkylene carbonate solvent in a weight ratio of alkylene carbonate to total non-alkylene carbonate solvent of about 2:1.

17. The process of claim 10, in which the mixture contains alkylene carbonate and non-alkylene carbonate solvent in a weight ratio of alkylene carbonate to total non-alkylene carbonate solvent of about 1:3.

18. A process for removing cured polyester resin from a substrate, consisting essentially of contacting a cured polyester resin with a co-solvent system containing alkylene carbonate and two non-alkylene carbonate solvents selected from the group consisting of tetramethyl urea, toluene, methyl isobutyl ketone, 1,2-dimethylimidazole, N,N'-dimethyl ethylene urea, cyclohexanone, acetophenone, acetone, and N-methyl pyrrolidone.

19. The process of claim 18, in which the two non-alkylene carbonate solvents are 1,2-dimethylimidazole and acetone.

20. The process of claim 18, in which at least one of the two non-alkylene carbonate solvents is selected from the group consisting of 1,2-dimethylimidazole and cyclohexanone.

* * * * *